US007903677B2

(12) United States Patent
Yasuda et al.

(10) Patent No.: US 7,903,677 B2
(45) Date of Patent: Mar. 8, 2011

(54) INFORMATION PLATFORM AND CONFIGURATION METHOD OF MULTIPLE INFORMATION PROCESSING SYSTEMS THEREOF

(75) Inventors: Yoshiko Yasuda, Tokorozawa (JP); Takashige Baba, Kodaira (JP); Jun Okitsu, Kodaira (JP); Toshiaki Tarui, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 11/649,761

(22) Filed: Jan. 5, 2007

(65) Prior Publication Data

US 2007/0165659 A1    Jul. 19, 2007

(30) Foreign Application Priority Data

Jan. 16, 2006    (JP) .................................. 2006-006902

(51) Int. Cl.
*H04L 12/28* (2006.01)
(52) U.S. Cl. ......................................... 370/404; 709/220
(58) Field of Classification Search .................. 370/254, 370/318; 711/114, 162; 709/213, 219; 714/4, 714/6
See application file for complete search history.

(56) References Cited

U.S. PATENT DOCUMENTS

| | | | | |
|---|---|---|---|---|
| 5,630,061 A * | 5/1997 | Richter et al. | ................ | 709/227 |
| 6,553,408 B1 * | 4/2003 | Merrell et al. | ................ | 709/213 |
| 6,580,439 B1 * | 6/2003 | Ardis et al. | .................... | 715/735 |
| 6,779,082 B2 * | 8/2004 | Burger et al. | ................ | 711/114 |
| 6,813,278 B1 * | 11/2004 | Swartz et al. | ................ | 370/466 |
| 7,013,334 B2 * | 3/2006 | Toyoshima et al. | ........... | 709/223 |
| 7,140,014 B2 * | 11/2006 | Coryell et al. | ................ | 717/176 |
| 7,188,201 B2 * | 3/2007 | Harima et al. | ................ | 710/104 |
| 7,194,538 B1 * | 3/2007 | Rabe et al. | ..................... | 709/224 |
| 7,221,857 B2 * | 5/2007 | Zimmermann | ............... | 386/124 |
| 7,373,670 B2 * | 5/2008 | Mimatsu et al. | ................ | 726/27 |
| 7,383,381 B1 * | 6/2008 | Faulkner et al. | .............. | 711/114 |
| 7,406,473 B1 * | 7/2008 | Brassow et al. | ................. | 707/10 |
| 7,415,565 B2 * | 8/2008 | Bullen et al. | .................. | 710/316 |
| 7,424,637 B1 * | 9/2008 | Schoenthal et al. | .............. | 714/6 |
| 7,447,838 B2 * | 11/2008 | Aoyama | ....................... | 711/114 |
| 7,487,381 B1 * | 2/2009 | Beaman et al. | .................... | 714/4 |
| 7,526,534 B2 * | 4/2009 | Henseler | ....................... | 709/220 |
| 7,565,502 B2 * | 7/2009 | Umemura | ..................... | 711/162 |

(Continued)

FOREIGN PATENT DOCUMENTS

JP    2000-137598    10/1998

(Continued)

*Primary Examiner* — Thong H Vu
(74) *Attorney, Agent, or Firm* — Stites & Harbison PLLC; Juan Carlos A. Marquez, Esq.

(57) ABSTRACT

An information platform system, the configuration thereof is able to change flexibly to meet the needs of the customers, and able to use a single adapter for multiple uses, wherein multiple general-purpose processing modules and dedicated processing modules for processing disks and external networks are connected to one another with switching hubs via respective adapters, and the platform system includes a management module having a system identifier management table specifying system type of the general-purpose processing modules, a functional set management table managing a functional set to be included by the general-purpose processing module of each system identifier, and the configuration management table managing the combination of the general-purpose processing modules and dedicated processing modules, and the management module selects a functional set from multiple functional sets, installs the selected functional set into a general-purpose processing module and an adapter, and manages the system configuration comprising of a general-purpose processing module and a dedicated processing module.

10 Claims, 9 Drawing Sheets

U.S. PATENT DOCUMENTS

| | | | |
|---|---|---|---|
| 2003/0009553 A1* | 1/2003 | Benfield et al. | 709/224 |
| 2003/0084397 A1* | 5/2003 | Peleg | 714/770 |
| 2005/0177624 A1* | 8/2005 | Oswald et al. | 709/219 |
| 2005/0198450 A1* | 9/2005 | Corrado et al. | 711/162 |
| 2005/0228950 A1* | 10/2005 | Karr | 711/114 |
| 2006/0045039 A1* | 3/2006 | Tsuneya et al. | 370/318 |
| 2006/0274674 A1* | 12/2006 | Okita et al. | 370/254 |
| 2007/0101173 A1* | 5/2007 | Fung | 713/300 |
| 2007/0168597 A1* | 7/2007 | Baba et al. | 710/316 |

FOREIGN PATENT DOCUMENTS

| | | |
|---|---|---|
| JP | 2004-110791 | 7/2003 |

\* cited by examiner

FIG. 2

120
SYSTEM CONFIGURATION MANAGEMENT TABLE

| SYSTEM NUMBER | 1 | 2 |
|---|---|---|
| GENERAL PURPOSE PROCESSING MODULE | N1 | N2 |
| DEDICATED PROCESSING MODULE | I1 | I2 |

121
SYSTEM IDENTIFIER MANAGEMENT TABLE

| MODULE IDENTIFIER (MID) | | N1 | N2 |
|---|---|---|---|
| SYSTEM IDENTIFIER (SID) | SYSTEM TYPE IDENTIFIER | S | R |
| | IDENTIFIER WITHIN TYPE | 1 | 1 |
| FUNCTIONAL SET IDENTIFIER (FID) | | 1 | 2 |

| SYSTEM TYPE | MEANING |
|---|---|
| S | SERVER SYSTEM |
| R | ROUTER SYSTEM |
| D | STORAGE SYSTEM |
| M | MANAGEMENT SYSTEM |

402
403
404
405

122
FUNCTIONAL SET MANAGEMENT TABLE

| FUNCTIONAL SET IDENTIFIER | 1 | 2 |
|---|---|---|
| FIRMWARE IDENTIFIER POINTER | FIRM A ○○○○ | FIRM B ○○○○ |
| OS IDENTIFIER POINTER | OS1 ○○○○ | OS2 ○○○○ |
| DRIVER IDENTIFIER POINTER | DRIVER X ○○○○ | DRIVER Y ○○○○ |

501, 502, 503, 504

| COMMAND IDENTIFIER | COMMAND TYPE |
|---|---|
| 1 | NEW SYSTEM CONFIGURATION REQUEST |
| 2 | NEW SYSTEM EXPANSION REQUEST |
| 3 | SYSTEM DEGENERATION REQUEST |
| 4 | SYSTEM DELETE REQUEST |
| 5 | SYSTEM FUNCTIONAL CHANGE REQUEST |

INFORMATION PLATFORM AND CONFIGURATION METHOD OF MULTIPLE INFORMATION PROCESSING SYSTEMS THEREOF

CLAIM OF PRIORITY

The present application claims priority from Japanese application JP 2006-006902 filed on Jan. 16, 2006, the content of which is hereby incorporated by reference into this application.

FIELD OF THE INVENTION

The present invention relates to an information platform, and particularly to an information platform constituted from multiple general-use processing modules and dedicated processing modules.

BACKGROUND OF THE INVENTION

In order to improve the investment efficiency to an IT system for a company, the needs are growing for consolidation of information platform systems. On one hand, it is considered, on one hand, that a server, a router, and a storage system constructed so far in individual housings are to be integrated into a single housing. On the other hand, companies are urged to have their services equipped with more advanced features by spreading of Web services. In order to develop various new services rapidly, and to provide the customer therewith, the information platform system for processing the services must be able to be flexibly changed into a configuration suitable for the services.

Generally, with a router or a storage system, a dedicated adapter is equipped, as a means for improving performance, and providing advanced-features. An embedded processor is integrated on the dedicated adapter, and thereon an embedded OS and firmware are run. Advanced features realized by these dedicated adapters are, for example, such as processing of a network processor in the router, and control processing of RAID (Redundant Arrays of Inexpensive Disks) in the storage device. Since the processing of a network processor or the RAID control processing requires a large amount of calculation power, it is more reasonable to utilize general purpose high performance processors instead of using an embedded processor, in order to realize further improvement in performance, and to provide the router or storage device with advanced-functions.

On the other hand, in the case of a server system, compared with a router or a storage system, the server is more advanced in commodity. For example, multiple server blades are connected to a high-speed backplane for a general server blade.

Multiple high performance processors are mounted on each server blade, wherein software is installed.

With the server system composed of multipurpose parts, the configuration of server is made flexible, and the technique of provisioning is used in order to make management of multiple server blades easier. By this technique, an OS is installed into a diskless server blade from a remote storage. For example, a technique of automatically assigning a CPU resource for a rack blade computer is disclosed in JP-A No. 110791/2004. A technique of assigning an OS and applications from a remote storage area is also disclosed in JP-A No. 110791/2004. By these techniques, responding to a customer's needs, the OS or applications can be changed without changing the hardware of a single server blade.

Generally, when the server accesses an I/O device such as a network or a storage device, it is necessary to mount a physical adapter for the I/O device. For example, in connecting the server to a LAN network, a NIC (Network Interface Card) is mounted, and in connecting the server to a SAN (Storage Area Network), a HBA (Host Bus Adapter) is mounted. When the server accesses to a network or storage, the adapter is accessed through the driver software for the physical adapter mounted on the server and a request is sent out to the target I/O device from the adapter. The technique of mounting separate HBA (Host Bus Adapter) in each server blade as a technique accessing SAN from a blade type server is disclosed in U.S. Pat. No. 6,771,499.

Now, as mentioned above, the dedicated adapter is conventionally used with the router or the storage system, and I/O adapters, and such as NIC and HBA, were used with the server. Conventionally, with these adapters the firmware on the adapter performs data transfer processing relevant to an I/O request. Or in the case of a high-performance adapter, protocol processing is also performed. Such firmware was mounted on the storage, such as a ROM. Therefore, it was difficult to remove the firmware in the case of updating due to a fault etc., and to change the firmware itself. For example, the method of updating the firmware of the specific adapter is disclosed in JP-A No. 137598/2000. By this method, the firmware of the network processor adapter of router can be updated, or the firmware of the adapter for RAID controllers for the storage device can be updated. That is, the firmware of the dedicated adapter mounted on various devices can be updated.

SUMMARY OF THE INVENTION

As stated previously, in order to develop new services quickly, reducing customer's investment cost, the configuration of information platform must be changed flexibly into a form suitable for the service, integrating the server, the storage, and the router into the same information platform system. However, with the present configuration of the router and storage devices, since the embedded CPU, built-in OS, and dedicated adapter are used, there is a problem that a high-performance processing of the router can be used only for the router system. Similarly, there is a similar problem that a high-performance processing of the storage system can be executed only for the storage system. As a result, it was difficult to change flexibly the configuration of the server, router, or storage devices in accordance with a customer's needs (the first problem).

In order to solve the first problem of the above, an information platform is required that can be changed flexibly in the configuration of devices, in order to meet a customer's needs.

With the technique disclosed in U.S. Pat. No. 6,771,499 when the number of slot for mounting adapters for I/O connection was not enough, the customer had to substitute the physical adapter, corresponding to the use. For example, NIC has to be changed into HBA when the customer who used SAN wants to use LAN. Moreover, although the target OS and applications to be installed in the server could be changed with the technique currently disclosed in JP-A No. 110791/2004, since the function of adapter was not able to be changed, the adapter had to be changed to the one with a required function corresponding to customer's needs. With the technology currently disclosed in JP-A No. 137598/2000, the dedicated adapter mounted on a certain device or the firmware of an I/O adapter can be updated. However, in the case where multiple computers exist, or multiple devices exist, it is not able to manage.

As a result, corresponding to the use, other physical adapters were needed separately, however, there caused a problem that the cost became expensive. Moreover, since physical substitution work needed in order to change the kind of adapter, the management cost increased. On the one hand, when a server progresses to have more multi-cores from now on, the performance of a server itself is expected to improve, on the other hand, it is expected that the number of physical adapters which can be mounted per core will decrease sharply. In such a situation, a physical adapter will exchange more frequently than one with the current system, and, as a result, the time and effort for the management will increase (the second problem).

In order to solve the second problem of the above, an information platform system is required wherein a single physical adapter may also be available to multiple uses.

The first object of the present invention is to offer an information platform system which can be changed flexibly in the configuration of system according to customer's needs.

The second object of the present invention is to offer an available information platform wherein a single physical adapter is also available to multiple uses, in order to curve the cost required for an adapter and to reduce the time and effort of management.

The information platform of the present invention comprising; multiple general-purpose processing modules and the dedicated processing modules which perform a disk processing and external network processing, and management modules which manage the information platform, and the above-mentioned objects are solved by the configuration connected to the switch hubs through the adapter mounted on each module.

The management module includes; one or more pieces of the device included in the information platform system, the general-purpose processing module constituting the system, the configuration management table having the identifier of an dedicated processing module, an system identifier management table holding correspondence of the system type assigned to the general-purpose processing module, and a functional set management table which manages one or more functional sets for constituting multiple system.

Furthermore, the management module includes a system configuration management unit which manages correspondence of a general-purpose processing module and a system type, chooses the functional set for installation from functional sets according to the system type. And then installs the set in the general-purpose processing module and in the adapter mounted thereon, thereby providing the general-purpose processing module with high performance, and manages the configuration of the system comprised from one or more general-purpose processing modules and one or more dedicated processing modules.

With the information platform system of the present invention, the function of system is changed according to customer's needs, and system can be constituted flexibly. Moreover, since such functional sets as OS, the device driver and firmware can be changed in accordance with the type of system, without changing the physical adapter, the introduction cost of system can be reduced and the management work associated with the adapter substitution can be reduced.

BRIEF DESCRIPTION OF THE DRAWINGS

FIG. 2 is a block diagram of the system configuration management table of the first embodiment in accordance with the present invention;

FIG. 3 is a block diagram of the system identifier management table of the first embodiment in accordance with the present invention;

FIG. 4 is a diagram showing the meaning of the system type identifier of the first embodiment in accordance with the present invention;

DETAILED DESCRIPTION OF THE PREFERRED EMBODIMENTS

First Embodiment

Figure 1:
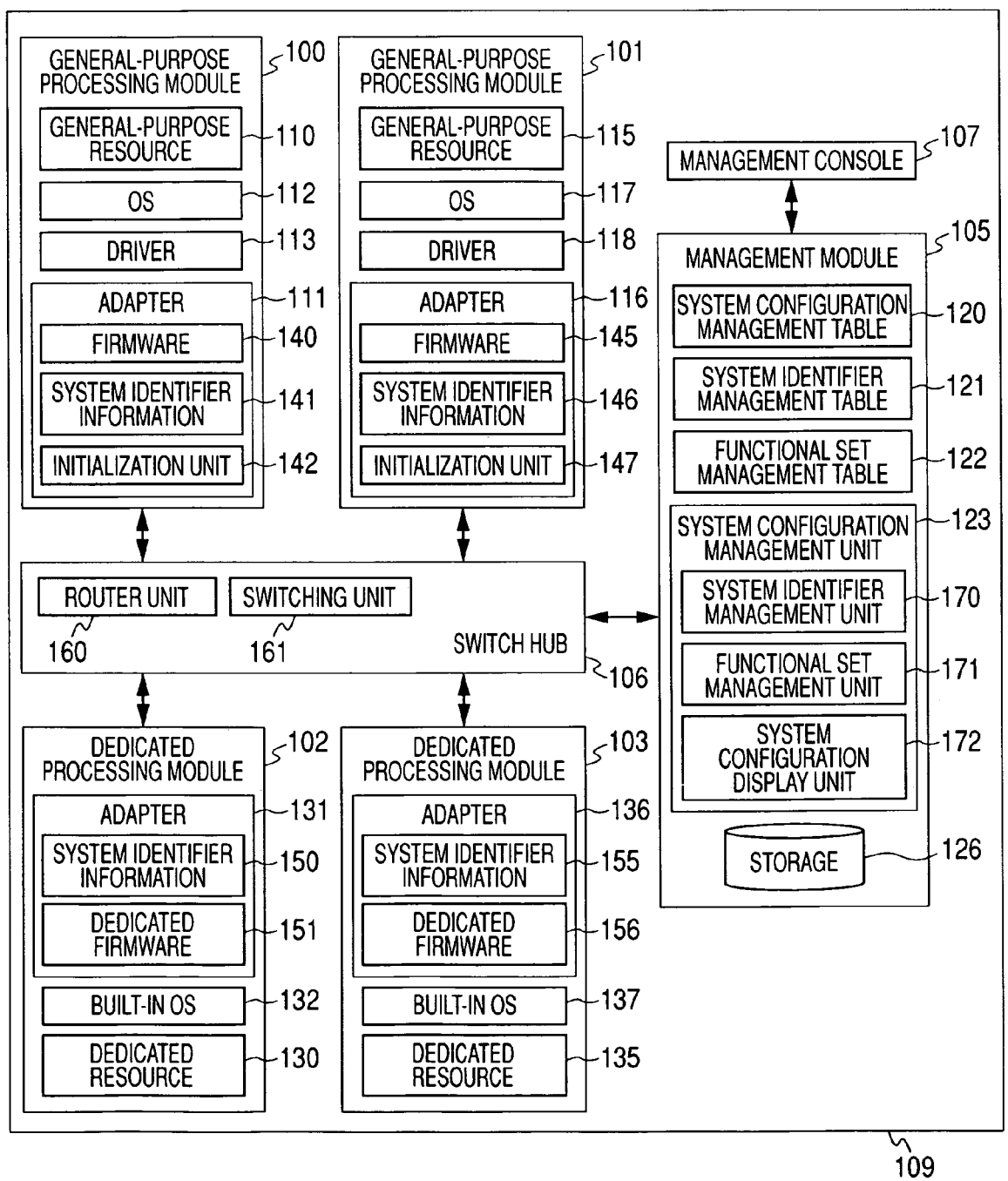
FIG. 1 is a block diagram showing the entire configuration of the information platform system of the first embodiment in accordance with the present invention.

FIG. 1 shows a block diagram of an information platform system 109 of the first embodiment in accordance with the present invention. The information platform system 109 comprises general-purpose processing modules 100 and 101, dedicated processing modules 102 and 103, a management module 105, a switch hub 106, and a management console 107.

The general-purpose processing modules 100 and 101, the dedicated processing modules 102 and 103, and the management module 105 are connected to the switch hub 106, and each module and the switch hub 106 are connected with a common physical interface. Actually, the adapter which is a connection interface with the switch hub 106 is mounted on each module and each module is connected with the switch hub 106 through each adapter. Although the common physical interface is used for connection, any protocol with higher hierarchy may be used. For example, the protocol may be an original protocol with a personal physical interface, or may be an original protocol with a normal physical interface such as PCI. Or the protocol may be a normal one with a normal physical interface such as, PCI Express or Advanced Switching Interconnect of PCI Express.

In the present embodiment, each module and a switch hub are connected with the physical interface of PCI Express. Moreover, in the present embodiment, although only the module is connected to the switch hub, multiple switch hubs may be connected.

The general-purpose processing modules 100 and 101 exchange management information and user data between the dedicated processing modules 102 and 103 and the management module 105 through the switch hub 106. Moreover, information is also exchanged between general-purpose processing modules. With a general-purpose processing module, advanced-features processing is performed, such as, for example, network processor processing of the router, the RAID control processing for the storage system, etc. In the present embodiment, although two general-purpose processing modules are illustrated, any number of modules may be included. In the present embodiment, although a general-purpose processing module is expected to use a commodity CPU, an embedded CPU or a reconfigurable CPU may be used.

The dedicated processing modules 102 and 103 exchange information between the general-purpose processing modules 100 and 101 and the managed module 105 through the switch hub 106. A dedicated processing module performs processing for dedicated devices, such as a line card connected to the external network of the router and hard disk drives of the storage system. In the present embodiment, although two dedicated processing modules are illustrated, any number of modules may be included.

The management module 105 manages the entire configuration of information platform system 109. In the present embodiment, although one management module is illustrated, multiple modules may be included, in order to improve reliability.

When multiple management modules are provided, the compatibility between management modules is to be taken.

The switch hub 106 connects between the general-purpose processing modules 100 and 101, the dedicated processing modules 102 and 103, and the management module 105. Any of a bus, a crossbar network, or a multi stage network may constitute the internal structure of the switch hub 106. Any structure may be employed for the switch hub as far as it can exchange information between a general-purpose processing module, a dedicated processing module, and a management module.

In the present embodiment, the switch hub 106 is a crossbar network.

A management console 107 is a computer with a CPU, a memory, etc. An administrator sends a request about the system configuration to a management module. As system configuration requests there are a new system configuration request for constructing a new system of information platform system 109, a system expansion request and a system degeneration request and a system delete request and a system function change request concerning configuration modification, and a system configuration investigation request. The details of a system configuration request are described later.

The general-purpose processing module 100 is equipped with a general-purpose resource 110, an adapter 111, an OS112 and a driver 113. The general-purpose processing module 101 is also of a similar structure. The general-purpose resource 110 is equipped with a CPU, a memory, etc. An adapter 111 is an interface for connecting the switch hub 106 and the general-purpose processing module 100. The OS 112 and the device driver 113 are software operating on the general-purpose processing module 100.

The adapter 111 is equipped with firmware 140, a system identifier 141, and an initialization unit 142. Firmware 140 is a program for performing fundamental operation for the adapter. The system identifier information 141 comprises a module identifier added to the general-purpose processing module, and a system identifier which shows the type of a general-purpose processing module. The initialization unit 142 initializes an adapter before installing the OS or the device driver. If a trigger from the management module 105 is received, the initialization unit 142 read out suitable information from the management module 105, and initializes the adapter 111. The initialization unit 142 may be prepared in a program form, and may be stored in a ROM by the default. In the present embodiment, although the initialization unit 142 on an adapter serves as a main subject and initializes the adapter, the management module 105 may serve as a subject sending information to an adapter, and initialize the adapter. As for the adapter 116, since it has a similar structure as the adapter 111, explanation is omitted.

Or all the adapters may have function as NIC beforehand. In that case, the initialization unit 142 of the adapter is equipped with an environment before execution equivalent to PXE, and can install firmware, OS, a device driver, etc. from remote.

Although not illustrated in the present embodiment, an adapter has a transmission control unit for receiving a request from a superior application, a destination is specified from the system structure information set in the system configuration management table 120 on the management module 105, add route information to the request and generate a encapsulated request, and transmit to the switch hub 106, or receiving the encapsulated request transmitted from the switch hub 106, then decapsulating and transmitting the request to or response about the request from superior application. Since the transmission control unit is realizable using a method like conventional Advanced Switching Interconnect of PCI Express, the description is not given here.

The transmission control unit may be included in the firmware of an adapter. Or the unit may be realized by hardware. Or the unit may be realized in the superior device driver layer. In the present embodiment, firmware contains a transmission control unit.

The dedicated processing module 102 comprises a dedicated resource 130, an adapter 131, and built-in OS 132. The dedicated resource 130 is I/O devices, such as a disk drive and a line card of a router, etc. The dedicated processing module 103 has also the same structure as the dedicated processing module 102. The adapter 131 is a connection interface for the dedicated processing module 102 and the switch hub 106.

A built-in OS132 is a program which performs I/O processing for exclusive use. The adapter 131 is equipped with a system identifier 150 and a dedicated firmware 151.

The system identifier 150 is a unique identifier added to the dedicated processing module. The dedicated firmware 151 is the firmware of adapter 131 for exclusive use of the dedicated processing module 102, and is a program for performing I/O processing for exclusive use like a built-in OS. As for an adapter 136, since it has a similar structure as the adapter 131, explanation is omitted.

The management module 105 comprises the system configuration management table 120, a system identifier management table 121, a functional set management table 122, a system configuration management unit 123, and a storage device 126.

The system configuration management table 120 manages the configuration module of multiple information processing systems constituted in the information platform system 109. Specifically, the management table manages the combination of the general-purpose processing module which constitutes information processing system, and a dedicated processing module. As a kind of systems for information processing system, there are a server, a router, and a storage system, etc. For example, a server system comprises a dedicated processing module, such as a disk, and multiple general-purpose processing modules. A router system comprises dedicated processing modules, such as a line card, and a general-purpose processing module which performs network processor processing. A storage system comprises a dedicated processing module containing disk drives with a storage controller, and a general-purpose processing module which performs advanced-features processing of RAID control processing etc. The management module 105 may manage various systems besides a server, a router, and a storage system. Any system constituted from the combination of a general-purpose processing module with a dedicated processing. module, may manage any kind of system. The details of the system configuration management table 120 are explained in FIG. 2.

The system identifier management table 121 manages correspondence between the identifier added to a general-purpose processing module, the identifier indicating the system type of the module, and the identifier indicating the functional set mounted on the general-purpose processing module. Here, system type shows the kind of information processing system with the general-purpose processing module as a component. From the system type, the system is identifiable whether the general-purpose processing module is a component of the server, or the router, or of the storage. The details of the system identifier management table 121 are explained in FIG. 3.

The functional set management table 122 manages a functional set installed in the general-purpose processing module. The functional set is the combination of the firmware of an adapter, OS, and a device driver, and multiple functional sets are managed on the functional set management table 122. The details of the functional set management table 122 are explained in FIG. 4.

The system configuration management unit 123 receives the management request of the system configuration sent out by the management console 107, and constitutes a system combining a general-purpose processing module and a dedicated processing module. The system configuration management unit 123 manages the configuration of all the systems. Therefore, the management unit 123 is able to access all of the system configuration management tables 120, the system identifier management tables 121, and the functional set management table 122.

The system configuration management unit 123 is equipped with a system identifier management unit 170, a functional set management unit 171, and a system configuration display unit 172.

The system identifier management unit 170 manages the allocation of a general-purpose processing module for information processing system, and read from or write on the system identifier management table 121. For example, when a certain general-purpose processing module is used as a component of server system, the system identifier which shows the server system is registered in the portion corresponding to the general-purpose processing module of the system identifier management table 121.

Or if the general-purpose processing module is used as a component of the router, the system identifier which shows router system is registered into the predetermined place of the system identifier management table 121. The system identifier management unit 170 cooperates also with the functional set management unit 171, and updates the system identifier management table 121 according to the table update request from the functional set management unit 171. The details of the system identifier management unit are explained in FIG. 7.

The functional set management unit 171 manages the functional set management table 122, and chooses a functional set which should be installed in a general-purpose processing module. And the selected functional set is installed in a chosen general-purpose processing module. The details of the functional set management unit 171 are explained in FIG. 6.

The system configuration display unit 172 receives the system configuration investigation request from the management console 107, and displays the system configuration management table 120 and the configuration of the information processing system managed by the system identifier management table 121. For example, if an administrator wants to investigate the configuration of the server system A constituted in the information platform unit 106, the system configuration display unit 172 displays only the information on the module which is a component of the server system A.

A storage device 126 is a storage area therewith the managed module 105 is equipped, and holds a functional set. Specifically, programs, such as firmware, OS, and a device driver, are stored.

The switch hub 106 is equipped with a route analysis unit 160 and a switching unit 161. The route analysis unit 160 receives the request from the adapter mounted in the connected module, analyzes the route information added to the header of request, and determines the output place of the switch hub 106. The switching unit 161 transmits a request to an output place determined by the route analysis unit 160.

FIG. 2 is a block diagram of the system configuration management table 120 of the embodiment 1. The system configuration management table 120 contains a system number 201, a general-purpose processing module number 202, and a dedicated processing module number 203. The system number 201 is a number uniquely identifying each information processing system constituted inside the information platform system 109. Although only with a system number, the information processing system managed with a system number cannot be uniquely specified whether the system is a server, a router, or a storage, a conversion table of the system type and the system number may be prepared for improvement in convenience. The general-purpose processing module number 202 shows the general-purpose processing module number which constitutes the system shown with the system number 201. The dedicated processing module number 203 shows the dedicated processing module number which constitutes the system shown with the system number 201. In FIG. 2 the system with system number 1 is constituted from the general-purpose processing module with number N1 (general-purpose processing module 100) and the dedicated processing module with number I1 (dedicated processing module 102). Moreover, as for the system with system number 2, the system is constituted from the general-purpose processing module with number N2 (general-purpose processing module 101) and the dedicated processing module with number I2 (dedicated processing module 103). Although in the present embodiment the general-purpose processing module number and the dedicated processing module number are separately determined it may be allowed to use the unified number to specify both modules. Moreover, in the present embodiment, although the dedicated processing module is assigned to separate systems, respectively, separate systems may share one dedicated processing module between two processing modules. Furthermore, although the general-purpose processing module is assigned to separate systems, a separate system may share one general-purpose processing module between separate systems. However, in these cases, virtual servers, such as LPAR (Logical Partitioning), should be used on the general-purpose processing module.

FIG. 3 is a block diagram of the system identifier management table 121 of the embodiment shown in FIG. 1. The system identifier management table 121 contains a module identifier 301, and a system identifier 302 and a functional set identifier 303.

The module identifier 301 is a unique name identifier of a general-purpose processing module. The system identifier 302 shows the system identifier currently assigned to the various modules shown by the module identifier 301. The system identifier 302 shows what kind of information processing system identified by each module identifier, the module is used. The system identifier 302 contains a system type identifier 310 and an identifier 311 within type. The system type identifier 310 shows whether a module is a server, a router, a storage system or a managing server. The identifier 311 within type is an identifier for identifying multiple information processing systems with the same system type. For example, when multiple server systems exist in the information platform 109, different numbers are assigned to the server systems, respectively. The functional set identifier 303 shows the identifier of the functional set currently assigned to the various modules shown by the module identifier 301. For example, FIG. 3 shows as for the module of N1, a module identifier is used as a component of the first server system, and mounting No. 1 of a functional set. Or the general-purpose processing module with the identifier of N2 is used as a component of the first router system, and the No. 2 of a functional set is mounted on the module.

FIG. 4 shows the kind and meaning of system type identifier 310 in the embodiment 1. In this embodiment, there are total of four system type identifiers.

The system type identifier S means a server system (402). The system type identifier R shows a router system (403). The system type identifier D shows a storage system (404). The system type identifier M shows a management system (405). If there is any information processing system which should be managed separately besides those described above, the system may be used by defining the system type.

When the system type and the functional set are not assigned to the module identified by the module identifier, NULL is set both to the system identifier and the functional set identifier. When neither system type nor functional set is assigned but this is discriminable, any values may be set to the module. When initializing a table, the identifier is set up for each module which exists in the information platform system, but a value is neither set to a system identifier nor to a functional set identifier. Or when the default structure for each general-purpose processing module has been determined beforehand, the predetermined system identifier and functional set identifier are set up at the time of table initialization. In the present embodiment although the dedicated processing module is handled as the type and the function of module are already determined and the system identifier management table 121 manages only the identifier of a general-purpose processing module, however, the system identifier management table 121 may also manage the identifier of a dedicated processing module.

Figures 5, 6:
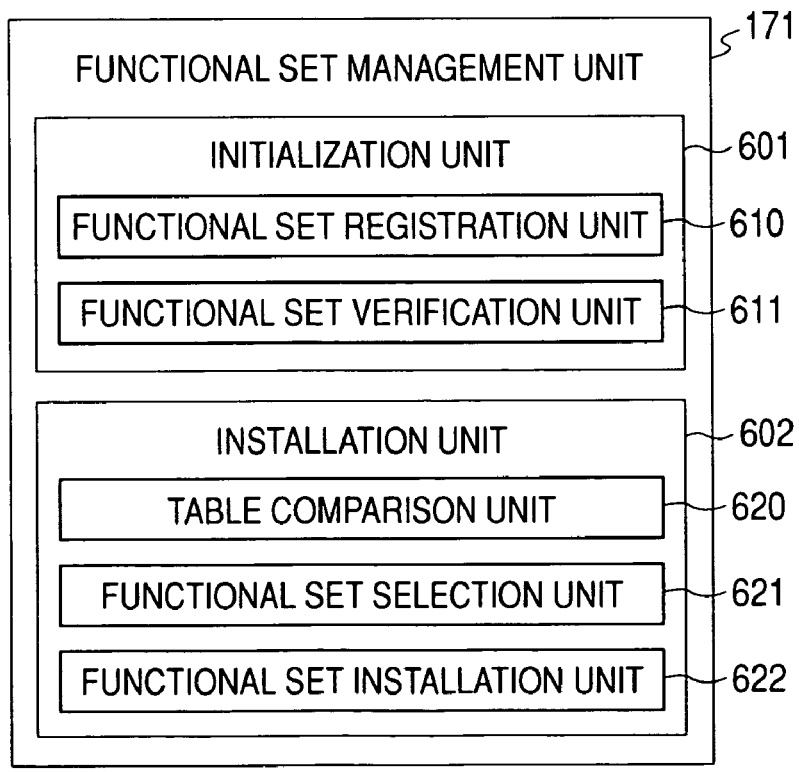
FIG. 5 is a block diagram of the functional set management table of the first embodiment in accordance with the present invention.
FIG. 6 is a block diagram of the functional set management unit of the first embodiment in accordance with the present invention.

FIG. 5 is a diagram showing the structure of the functional set management table 122 in the embodiment 1. A functional set is a program group for realizing high performance, for example, an OS, a device driver, etc., which are mounted on the firmware or the general-purpose processing module of an adapter. A functional set identifier is registered into the column 501 of the functional set managed table 122, and a firmware identifier is into the column 502, an OS identifier is registered into the column 503 and the device driver identifier 504 is registered into the column 504. This functional set identifier is the same as the functional set identifier 303 set up on the system identifier management table 121 of FIG. 3. A firmware identifier, an OS identifier, and a device driver identifier are registered into the columns 502, 503, and 504 of the functional set management table 122, corresponding to the above-mentioned functional set identifier, respectively. The specific contents of the columns 502-504 are bender ID or version numbers of the program group already installed or planned to be installed into a general-purpose processing module corresponding to the functional set identifier in column 501, and an address pointer with which entities of these programs are held. That is, in this embodiment, each program item of a functional set i.e., the entity of the firmware, OS, or a device driver is held in the storage device 126 in the managed module 105. The identifier and address pointer of these programs are registered into the functional set management table 122. In addition, the entities of the programs constituting the functional set may be stored in one of the dedicated processing modules, such as a disk drive instead of the storage device 126.

FIG. 6 is a block diagram of a functional set management unit 171 in the embodiment 1. The functional set management unit 171 contains an initialization unit 601 and an installation unit 602.

The initialization unit 601 performs initialization of the functional set management table 122. That is, functional set installable in a general-purpose processing module is prepared.

According to the system construction request (new or change) from the management console 107, the installation unit 602 chooses a functional set and installs it in a general-purpose processing module.

The initialization unit 601 includes a functional set registration unit 610 and a functional set verification unit 611. The functional set registration unit 610 stores in the storage device 126 a functional set registered in the functional set management table 122, and sets the functional set identifier, the pointer information over the entity of firmware, OS thereof, and device driver. Although not illustrated in the embodiment, the managed module 105 possesses an interface for registering a functional set. The details of registration processing of a functional set are described later (referring to FIG. 9).

The functional set verification unit 611 verifies whether the functional set registered newly on the functional set management table 122 functions properly. When the functional set is judged not functioning properly, either the functional set registration processing is repeated or an administrator is notified through a registration interface of the fact that registration processing has gone wrong. Registration of the functional set may be performed beforehand or an administrator may register the functional set afterwards. Moreover, in the embodiment 1, verification of the functional set is performed whether the set operates correctly when the functional set managed table 122 is initialized, however, the verification may be performed at installation thereof.

The installation unit 602 includes a table comparison unit 620, a functional set selection unit 621, and a functional set install unit 622.

The table comparison unit 620 compares the system identifier information 141 and 146 on the adapter of the general-purpose processing module wherein the functional set is installed, with the system identifier 302 corresponding to the general-purpose processing module in the system identifier management table 121 of the management module 105 corresponds. Thereby, judgment is made whether a new functional set is installed or a previously installed functional set is replaced by another functional set into a general-purpose processing module.

The functional set selection unit 621 chooses one of the functional set identifiers 501 of the functional set management table 122 using the information including system type, firmware, the kind of OS, and etc., included in a system configuration request.

The functional set installation unit 622 installs the combination of the firmware, OS, and a device driver corresponding to the selected functional set identifier 501, in the corresponding general-purpose processing module from the storage device 126 of the management module. After termination of installation, the functional set installation unit 622 requests the system identifier management unit 170 to set the identifier of the installed functional set to the system identifier management table 121. In the present embodiment although one of the functional sets is chosen utilizing the information included in the system configuration request from outside, however, one of the functional sets may be chosen from a group of installation candidates for the functional set by displaying the candidates on them a management console.

Furthermore, the functional set installation unit 622 makes comparison between a firmware identifier, an OS identifier, a driver identifier, shown by the selected functional set identifier, and the firmware identifier, an OS identifier, a driver identifier shown by the functional set identifier already installed, respectively, and installs only those functions, the identifier thereof does not agree, into the general-purpose processing module. Thereby, the futility of installation is excluded and the structure of systems can be quickly changed now.

Furthermore, when the functional set installation unit 622 installs a functional set, first installing the firmware to the adapter, and then the functional set install unit 622 may install the set of OS and a device driver.

Figure 7:
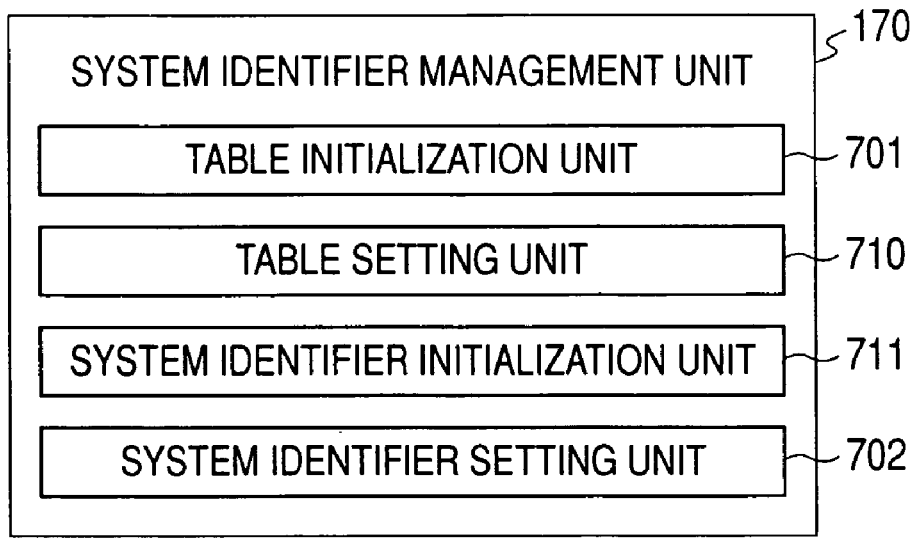
FIG. 7 is a block diagram of the system identifier management unit of the first embodiment in accordance with the present invention.

FIG. 7 is a block diagram of the system identifier management unit 170 in the embodiment 1. The system identifier management unit -124 has the table initialization unit 701, the table setting unit 702, the system identifier initialization unit 703, and the system identifier setting unit 704.

When the table processing unit 701 recognizes that the general-purpose processing module is physically connected to the switch hub 106, then the processing unit 701 initializes the system identifier management table 121 by adding a unique number to the general-purpose processing module.

The table setting unit 702 sets up or updates a value on the system identifier management table 121, when a functional set is newly assigned to a general-purpose processing module, or when the already assigned functional set is changed.

When a general-purpose processing module is newly connected to the switch hub 106, the system identifier initialization unit 703 sets the general-purpose processing module number assigned based on the setup of the system identifier management table 121 of a managed module to the module identifier 141 or the module identifier 146. And NULL is set to the module identifier prepared as a pair for the module identifier 146.

When the system identifier setting unit 704 assigns a functional set, or changes already assigned functional set to a general-purpose processing module, a value for the system identifier is set to the system identifier information of the general-purpose processing module.

Figure 8:
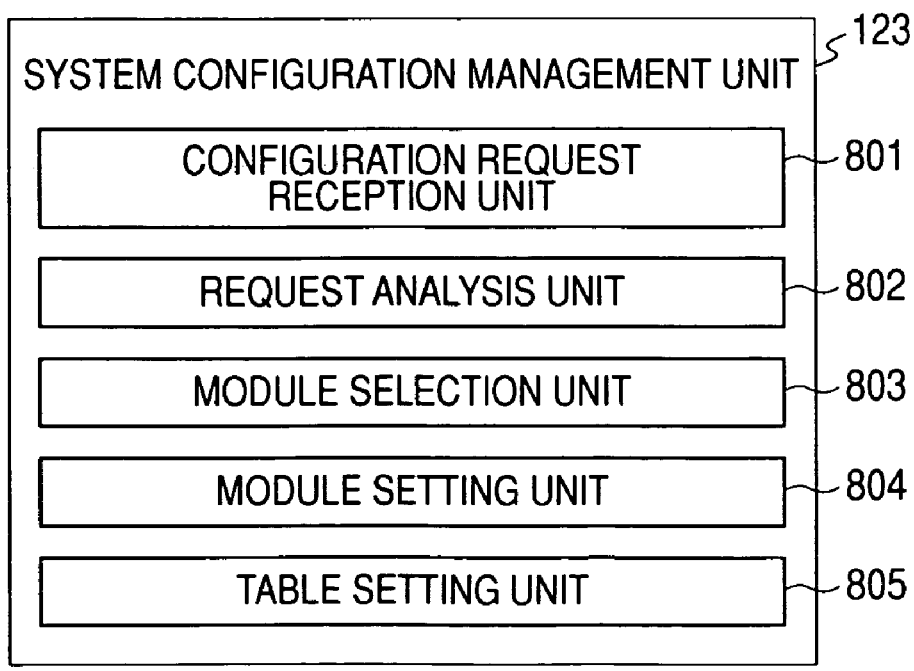
FIG. 8 is a block diagram of the system configuration management unit of the first embodiment in accordance with the present invention.

FIG. 8 is a block diagram of the system configuration management unit 123 in the embodiment 1. The system configuration management unit 123 is equipped with the configuration request reception unit 801, the request analysis unit 802, the module selection unit 803, the module assignment unit 804, and the table setting unit 805.

The configuration request reception unit-801 receives the command for constituting system via the management console. The system configuration request from an administrator is received and the received system configuration request is transmitted to the request analysis unit 802. The command may be transmitted on a Web basis from the management console, or may be inputted via a serial port.

The request analysis unit 802 analyzes the system configuration request sent from the configuration request reception unit 801.

Figures 9, 10:
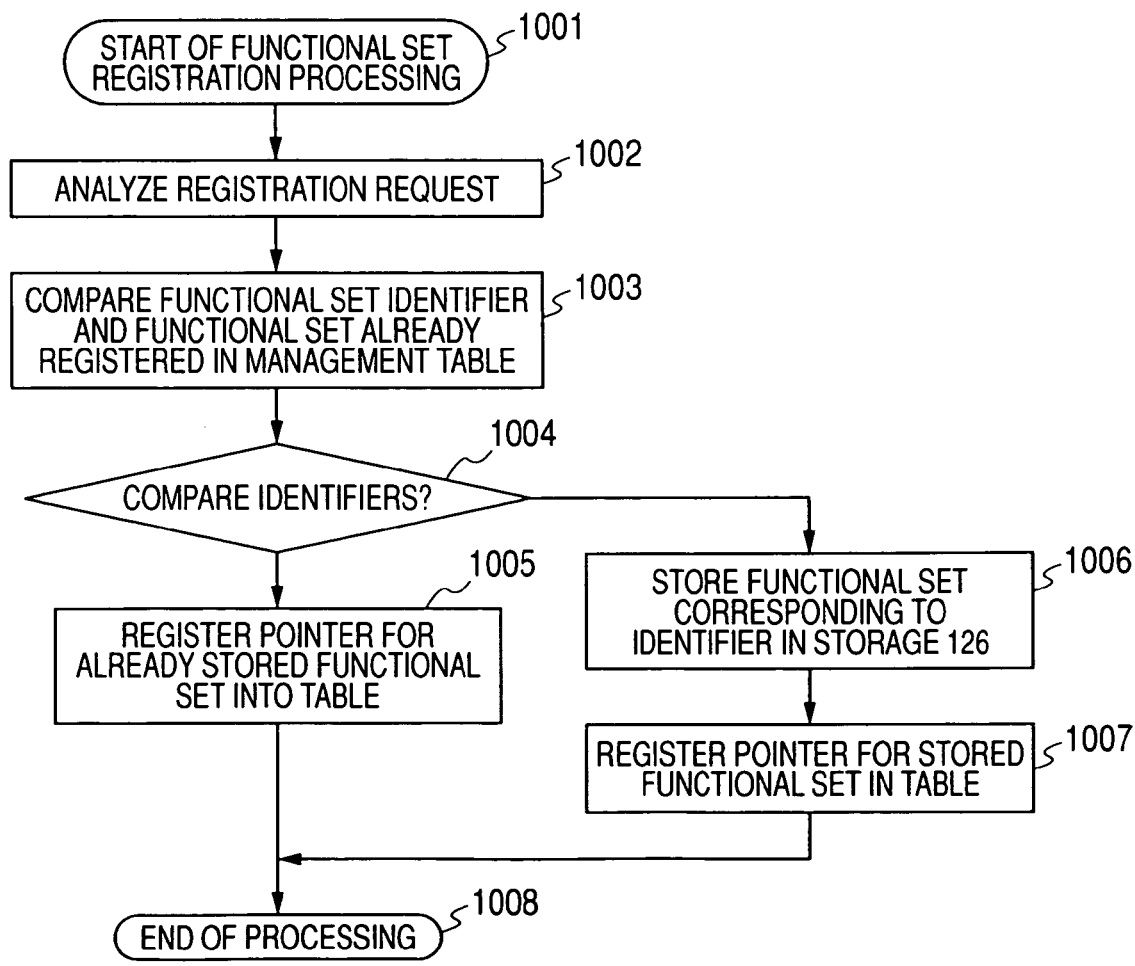
FIG. 9 is a table showing the kinds of system configuration requests of the first embodiment in accordance with the present invention.
FIG. 10 is a flow chart showing the functional set registration processing of the first embodiment in accordance with the present invention.

FIG. 9 shows the kind of system configuration request which the request analysis unit 802 analyzes. The new system configuration request 901 constitutes a new information processing system from multiple general-purpose processing modules and dedicated processing modules. If the general-purpose processing module to be used as a component has been already a component of other information processing system, consideration is made over the situation, and if possible, the general-purpose processing module is to be used as a component of the new information processing system, however if not possible, another module is chosen for the component or the configuration of the new information processing system is suspended.

When the performances and functions of a certain information processing system turn out to be insufficient, the system expansion request 902 expands the information processing system by adding a general-purpose processing module.

If the general-purpose processing module to be add is new, i.e., if the module is not a component of other information processing systems, a functional set will be installed thereto and the module becomes a component of the information processing system.

When the general-purpose processing module to be added is a component of other information processing systems, the administrator of the other information processing system is asked whether the general-purpose processing module may be used for another information processing system. When the permission for use is given, the target general-purpose processing module is separated using the system degeneration request 903 mentioned later, and the module is added to the information processing system for expansion. When the permission for use is not given, the expansion of the system is suspended.

When the performance and the function of a certain information processing system become unnecessary, the system degeneration request 903 excludes a general-purpose processing module from the components, and degenerates the information processing system.

The system elimination request 904 eliminates the information processing system, and makes free the general-purpose processing module and the dedicated processing module which are components.

The system functional change request 905 is used when changing some functional sets of the general-purpose processing module of information processing system.

Except those, there are a request for displaying the configuration set by an administrator and various system systems, however, since the systems are able to be realized by combining five system requests mentioned above, the explanation is omitted here. In the present embodiment, explanation is given to the case where an administrator publishes a system configuration request, however, instead of being requested by an administrator, submitting a plan may be taken for an automatically configurable system via the management console.

A new system configuration request includes a type of the information processing system (system type of an system identifier) to be constituted, number of modules of the system to be constituted (for each of the general-purpose and the dedicated modules), and the kinds of functional set (kind of OS, and the like). For example, as a type of system, it is specified whether a server system, a router system, or a storage system is constituted. About a functional set, the version of OS, the device driver, and firmware which should be installed is specified. As a method of specifying, system type is made to input, a management module chooses the functional sets which serve as candidates, a list thereof may be displayed on a management console and an administrator may choose one from the list, or and as long as it is a server system, a functional set may be predetermined from the compatibility with each other.

According to a system configuration request, the module selection unit 803 investigates each entry of the system identifier management table 121, and chooses the module which is the target of a system configuration request. In the new system configuration request 901 of FIG. 9, a new general-purpose processing module is usually chosen at random. However, when the new general-purpose processing module which can be chosen does not exist. The information processing system which may be able to accommodate a general-purpose processing module is chosen, and when that is transmitted to an administrator and an administrator's permission gets down, the general-purpose processing module which already serves as a component of a certain information processing system is chosen as one of the new components. Or the module selection unit 803 may choose automatically a general-purpose processing module with a low CPU usage by using statistical data etc.

Also in the system new expansion request 902 of FIG. 9, the general-purpose processing module equivalent to the number of additional modules is chosen. The selection method is the same as that of the system new configuration request 901. An administrator may specify the module for degeneration clearly in the system degeneration request 903, or a system may choose automatically the module which can degenerate. In the system deletion request 904 as well as the new system configuration request 901, the component of the information processing system for deletion is chosen.

In the case of the system functional change request 905, an administrator may specify clearly the general-purpose processing module for which a functional change is to be applied, or a candidate of the general-purpose processing module for the functional change may be instructed to an administrator.

To the selected module, the module setting unit 804 installs a functional set to the selected module by the functional set management unit 125, and sets system type as a module. Or the functional set of the selected module is uninstalled and the module is returned to an initialization state.

The table setting unit 805 receives the result of the module selection unit 803, and registers a new system into a system configuration management table. Or according to the system change request from the administrator who received the request at the system configuration request reception unit 801, the system type installed in a module is changed and a system configuration management table is updated. Or the module registered from various tables is deleted.

FIG. 10 is a diagram showing the flow of the functional set registration processing in the embodiment 1. Functional set registration processing is started when a management module receives the functional set registration request from the outside.

The received registration request is analyzed at Step 1002. At step 1003 each identifier of a functional set contained in the analyzed registration request is compared with a functional set already registered in the functional set management table. Specifically, each of a firmware identifier, OS identifier, and a driver identifier is checked whether it is registered on a functional set-management table. At Step 1004, it is judged whether each identifier of a functional set and the identifier of the already registered functional set are in agreement. When there is an agreement Step 1005 is performed, while there is no agreement Step 1006 is performed. At Step 1005, when each identifier of the functional set is already registered into the functional set management table, the pointer for the already stored functional set is registered in a functional set management table, without holding the entity (program) of an identifier in a storage device. At Step 1006, the functional set for an identifier is held in storage 126.

And at Step 1007, the pointer to the held functional set is held on the functional set management table 122. Then the functional set registration processing is completed.

Figure 11:
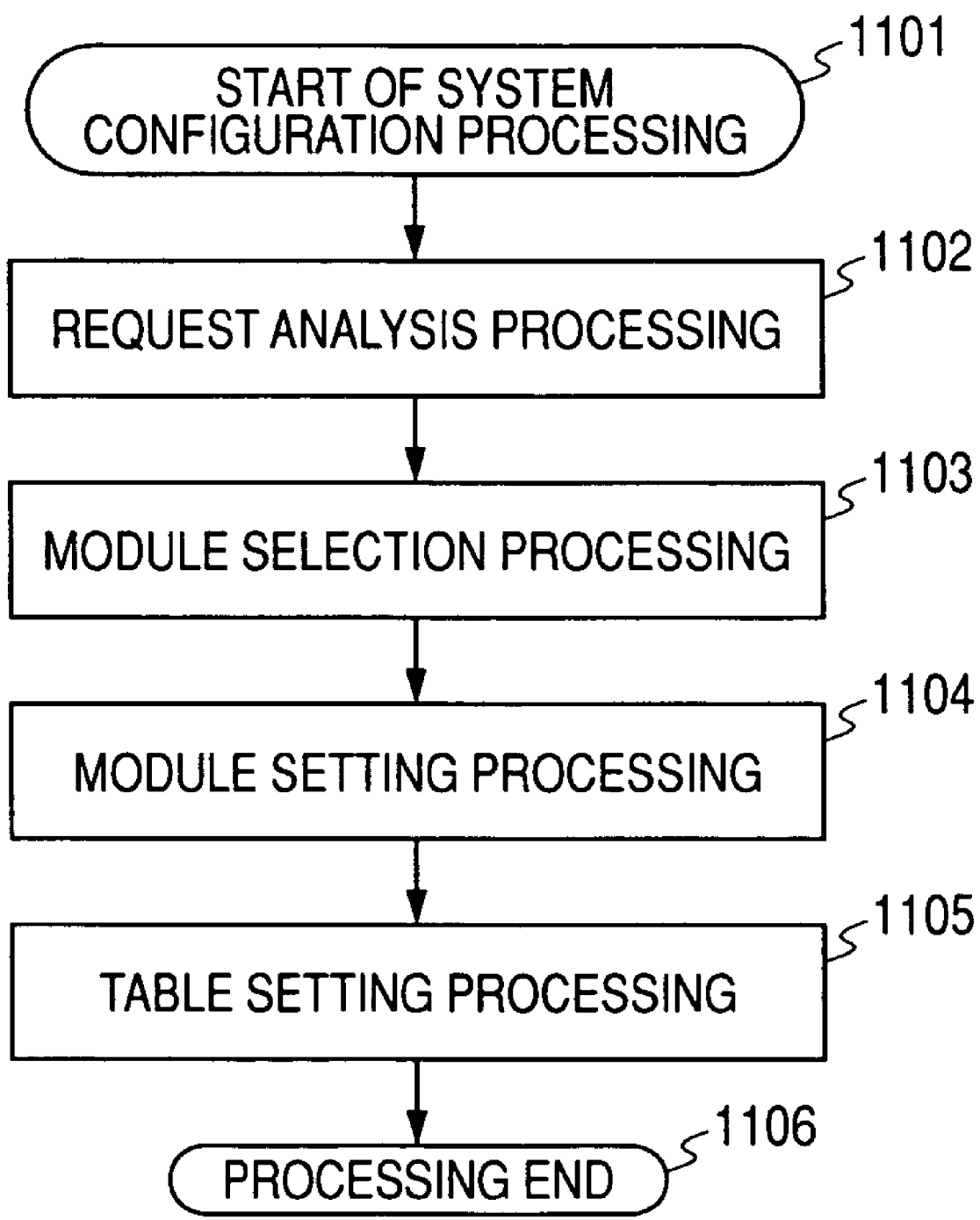
FIG. 11 is a flow chart showing the system configuration request processing of the first embodiment in accordance with the present invention.

FIG. 11 is a diagram showing the processing flow to the system configuration request in the embodiment 1. The management module 105 begins the system configuration processing 1101, when a system configuration request is received from the management console 107. The system configuration processing 1101 comprises the steps of; request analysis processing (Step 1102), module selection processing (Step 1103), module assignment/deletion (Step 1104), and table setting processing (Step 1105).

In the request analysis processing 1102, the system configuration request received via the management console 107 is analyzed, and the kind of request is specified. Subsequent processing is selected according to the kind of request.

In the module selection processing 1103, the system identifier management table 121 is investigated according to the information included in the system configuration request, and a module is chosen required to execute this system configuration request.

In the module setting processing 1104, a module is assigned or deleted according to the system configuration request. For example, in a new system configuration request, a functional set is installed to a new module so that a general-purpose processing module is provided with a high performance processing. Or in a system deletion request, the function of the general-purpose processing module, one of the components of member of the information processing system for deletion is returned to the state at the time of initialization.

The table setting processing 1105 performs the registration, change, and deletion to a system identifier management table and a system configuration management table according to an system configuration request.

Next, the processing flow to a new system configuration request is explained in detail among processing of system configuration request.

Figure 12:
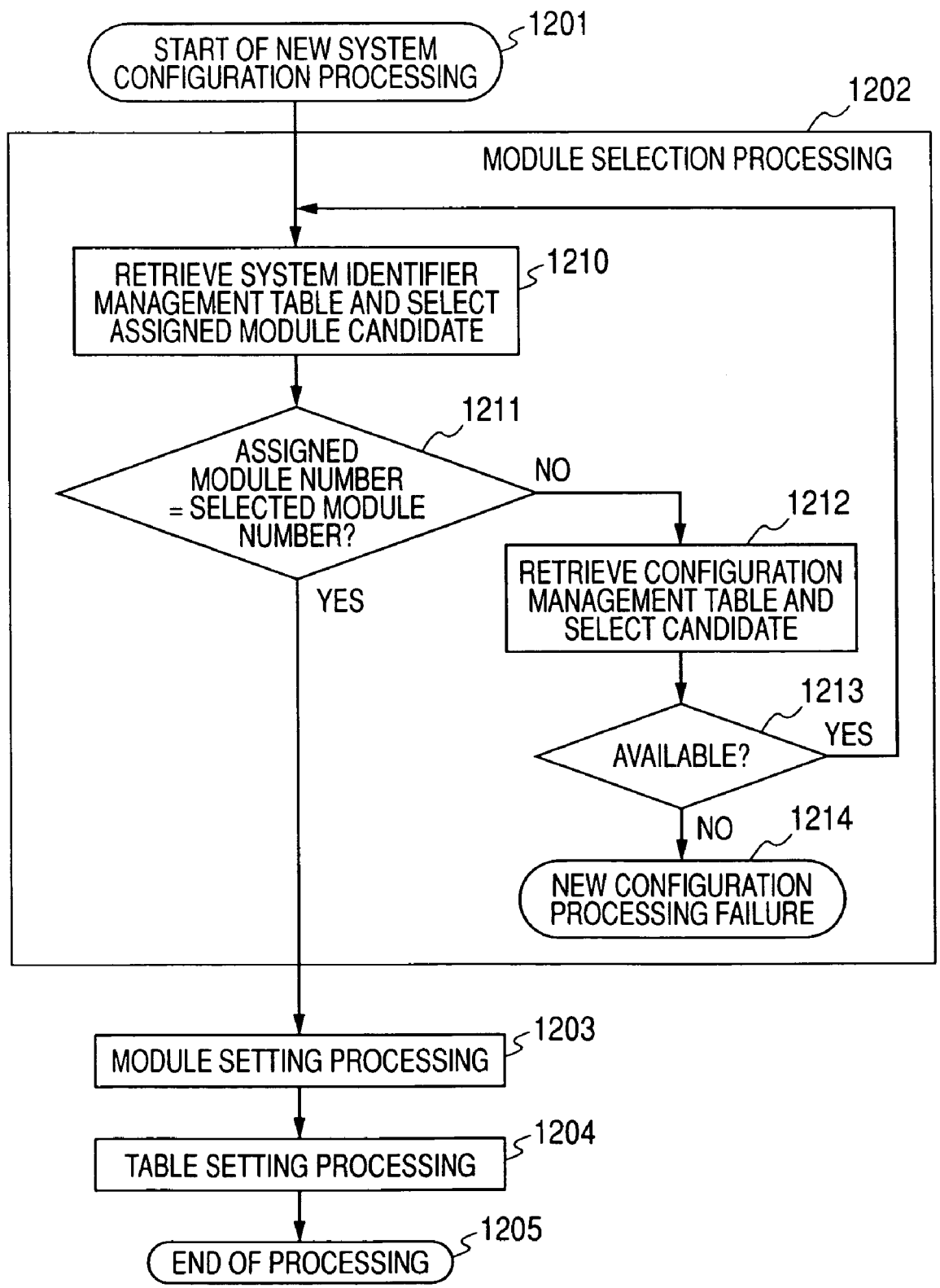
FIG. 12 is a flow chart showing the processing to a new system configuration request of the first embodiment in accordance with the present invention.

FIG. 12 is a diagram showing the flow of new system configuration request processing. System new configuration request processing is made up of the module selection processing 1202, module setting processing 1203, and table setting processing 1204.

The module selection processing 1202 is made up of steps from 1210 to 1214.

At step 1210, each entry of the system identifier management table 121 is investigated, and a new general-purpose processing module is chosen. For example, it chooses at random or may choose according to a policy. e.g. a shorter connecting distances. The new system configuration request includes the number of general-purpose processing modules to be chosen. Or only the specification of the system is specified in the new configuration system, and the number of processing modules may be automatically decided to meet the specifications.

At Step 1211, it is judged whether the specified number of modules and the number of modules which can be chosen are in agreement. When there is an agreement, the module selection processing 1202 ends. Step 1212 is performed when there is not agreement i.e., when number of modules which can be chosen are less than the specified numbers.

At step 1212, when the specified number of new general-purpose processing modules does not exist, the system configuration management table 120 is searched and choose an information processing system is chosen which may be adaptable to providing a general-purpose processing module. The selection method may be at random or may be chosen according to a policy.

At step 1213, it is judged whether the general-purpose processing module which is a component of the information processing system chosen at Step 1212 can be used.

For example, it is reported to the administrator of a certain information processing system whether one of the general-purpose processing modules may be adaptable.

When an administrator's permission gets down, the general-purpose processing module which already serves as a component of a certain information processing system is chosen as one of the new components. Or the module selection unit 803 may choose automatically a general-purpose processing module with a low CPU usage in use judged from statistical data etc. When a module is available, it may be chosen at random and setting up a policy, or may be chosen according to a policy.

At step 1214, since the number of modules specified cannot be chosen, an administrator is notified of an alternative system proposal, or constituting the system from minimum components, or reported that it is impossible to constitute the system, and the module selection processing is completed.

Figure 13:
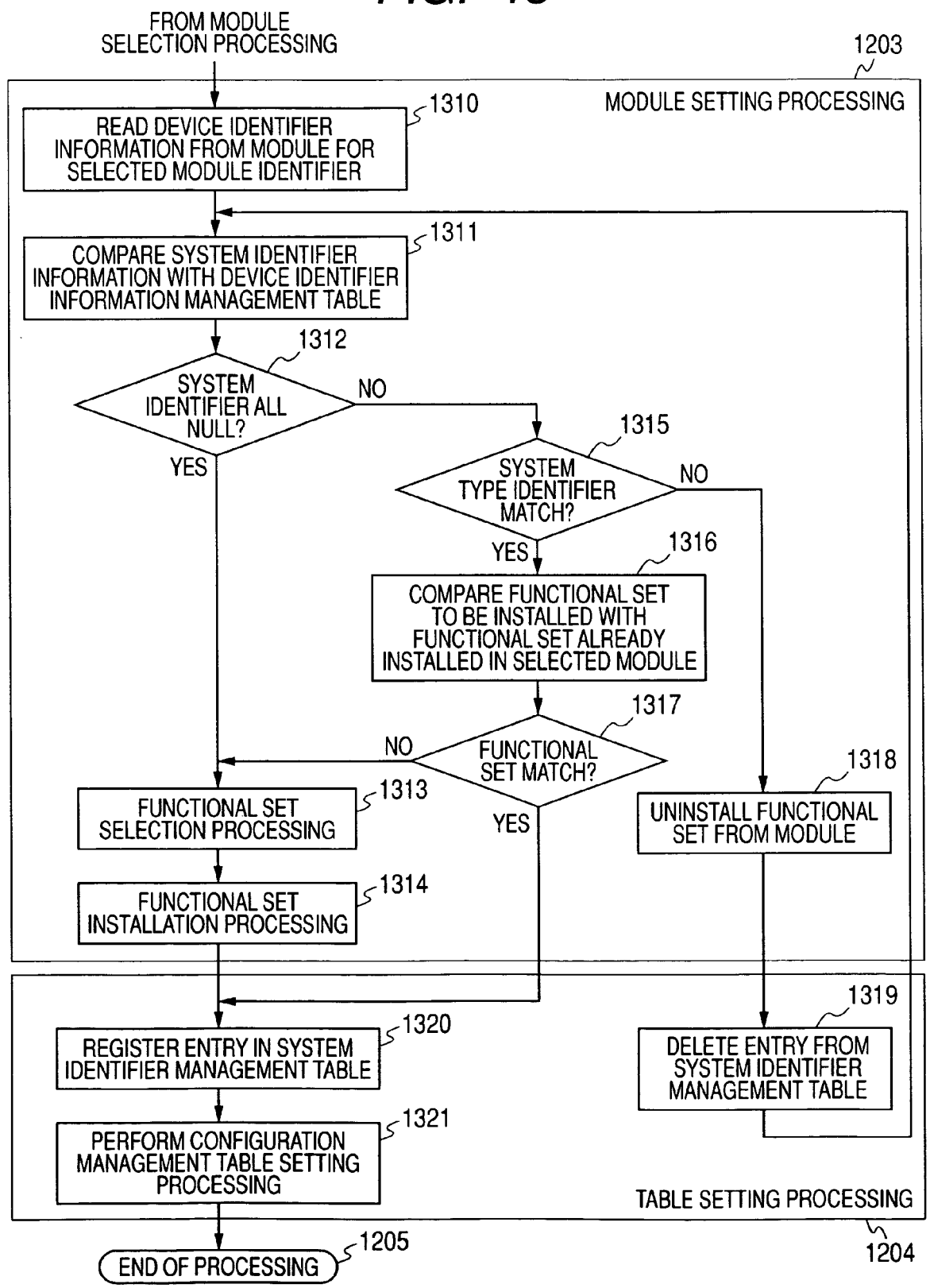
FIG. 13 is a flow chart showing the module setting and table setting up processing to a new system configuration request of the first embodiment in accordance with the present invention.

The processing flow of the module setting processing 1203 and the table setting processing 1204 is shown in FIG. 13. The module setting processing 1203 performs processing Steps 1310-1318 by each processing unit of the functional set management unit 171 of FIG. 6.

Step 1310 reads system identifier information from each module chosen by the module selection processing 1202. Step 1311 compares the system identifier information read from the module with the system identifier for the module identifier of the system identifier management table 121. At Step 1312, it is judged whether each of all system identifiers is NULL. Step 1313 is performed when all are NULL(s). At Step 1313, a functional set to be installed is chosen from the functional set management table 122.

At Step 1314, the functional set chosen at Step 1313 is installed in an object general-purpose processing module. The firmware, OS, and a system driver which should be installed from the address for the selected functional set, are read out, and are installed in the selected module.

Step 1315 is performed when the judgment result of Step 1312 is NO, judgment is made whether the system type identifier of system identifier information agrees with the newly constituted system type. The newly constituted system type may be included in the new configuration request. When there is an agreement, Step 1316 is performed, and when there in no agreement, Step 1318 is performed.

As a result of judgment at Step 1312, when the system type identifiers are in agreement, at Step 1316 a functional set to be constituted is compared with the functional set already installed in the selected module. That is, it is judged whether the module to be used for constituting a new system was previously used by other information processing systems, and the system type has been changed. For example, when both system types are in agreement, it means that a general-purpose processing module which is a component of a certain server is used as a general-purpose processing module of another server system.

At Step 1317 as a result of a comparison, it is judged whether a functional set to install and a functional set already installed are in agreement. When there is an agreement, since the module has a required function, the installation processing of a functional set is not performed, but processing proceeds to Step 1320. When there is no agreement, Step 1313 is performed.

Step 1318 is performed when the equipment type identifiers differ from each other. This corresponds to the case where a general-purpose processing module of one information processing system is utilized as a general-purpose processing module of an information processing system with another system type. For example, it corresponds to the above case that using the general-purpose processing module which was a component of a router system as a component of a server system. At this step, a functional set is uninstalled from the module, then the module is returned to the initialization state, and Step 1319 is performed.

The table set up processing 1204 processes Step 1321 from Step 1319.

Receiving the result of Step 1318, Step 1319 writes NULL for deletion from a system identifier management table for the entry value of the corresponding to the module identifier of the general-purpose processing module, and returns to Step 1311. After installing a functional set to a general-purpose processing module at Step 1314, Step 1320 registers an entry into a system identifier management table. Specifically, the identifier of system type, a unique identifier within the system type, and the identifier of the functional set are registered. After a setup of a functional set is finished, Step 1321 is performed to all the general-purpose processing modules for the system, and the composition module identifiers of the constituted information processing system are registered on the system configuration management table 120. Thus, new system configuration processing ends.

In the first embodiment described above, although the details about other system configuration requests processing are not explained, the requests are able to be realized with similar processing flows shown in FIGS. 12 and 13.

Second Embodiment

In the above-mentioned first embodiment, when the request was received from a high order application, an adapter investigated the system configuration management table 120, specified the processing module whereto the request is to be transmitted, and generated the encapsulated request by adding route information to the request and sent the request to the switch hub 106. Moreover, when the adapter received an encapsulated request with added route information from the switch hub 106, the adapter removed the added information and transmitted the decapsulated request to an application.

However, it is inefficient to ask the management module 105 about a destination module, whenever the adapter receives a request. Therefore, in the embodiment 2, the adapter mounted on a general-purpose processing module or a dedicated processing module is provided with a subset of the system configuration management table 120.

Figure 14:
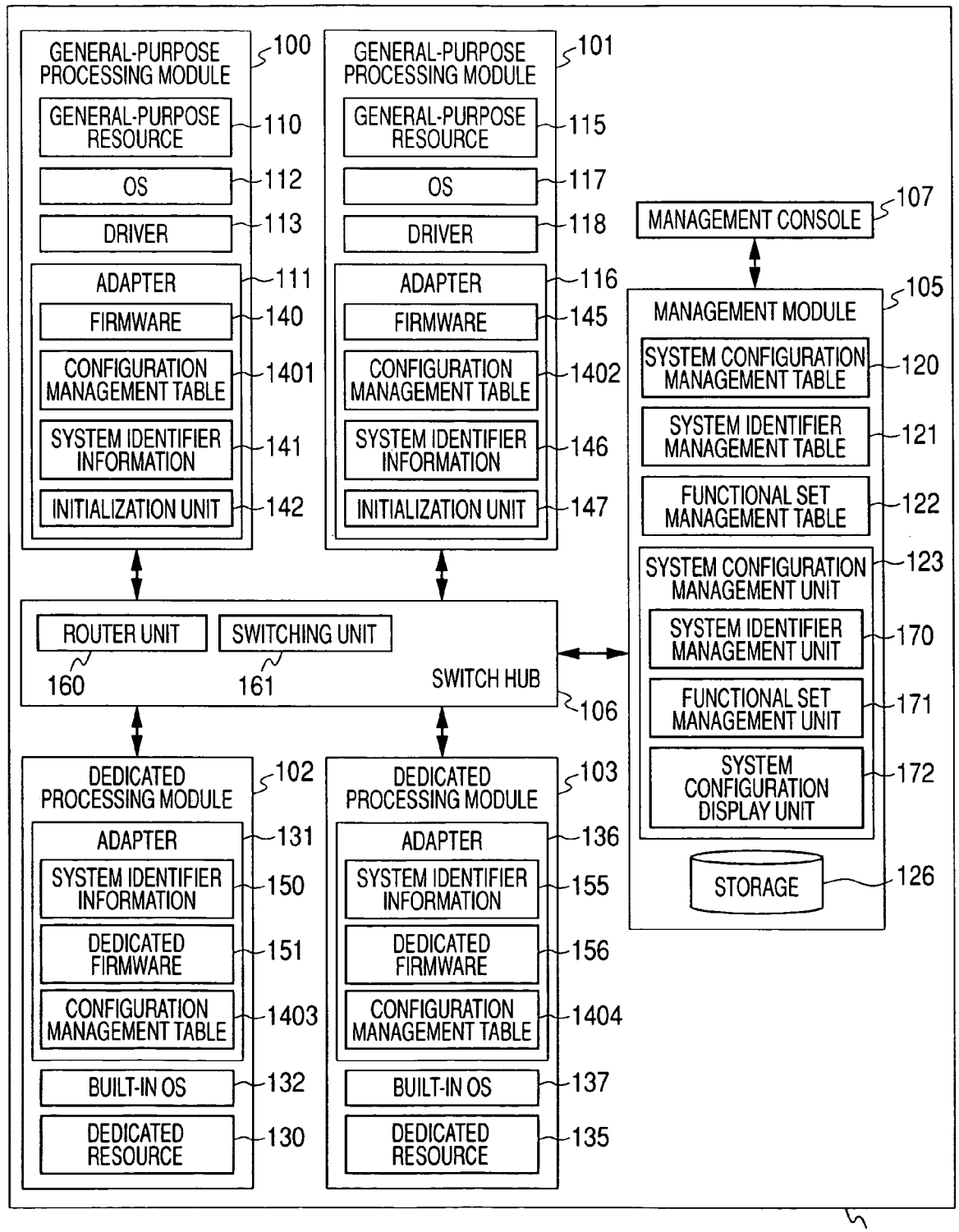
FIG. 14 is a block diagram showing the entire configuration of the information platform system of the second embodiment in accordance with the present invention.

The block diagram of the information platform system of the second embodiment is shown in FIG. 14. The configuration management tables 1401, 1402, 1403, and 1404 in FIG. 14 differ from the first embodiment.

For example, when the information processing system #1 comprises a general-purpose processing module 100 and a dedicated processing module 102, the configuration management table 1401 holds the configuration information for the system number 1 of the system configuration management table. In this case, the information of N1 and I2 is held. The configuration management table 1403 also holds the same information as the configuration management table 1401. The configuration management tables 1402 and 1404 hold the information N2 and I1 for the system number 2. The contents of the configuration management tables 1401, 1402, 1403, and 1404 are updated, when an information processing system was constituted newly, or when the configuration of system is changed. That is, when the contents of system configuration management table 120 is rewritten, the contents are always updated.

As described above, it becomes unnecessary to ask the management module 105 whenever a request is transmitted, by providing each adapter with information on the system configuration whereto the adapter belongs, and thereby request processing can be efficiently performed.

Third Embodiment

In the above-described first embodiment, the function of dedicated processing module was fixed. On the other hand, in the third embodiment, the functional set is made to be variable also with the dedicated processing module. Accordingly, the system identifier management table 121 shown in FIG. 3 is extended, and also enabled to manage the identifier of a dedicated processing module.

The present invention can be used for a modular type information platform system, and contributes to the improvement in flexibility and expandability of the function of concerned modular type information platform system.

What is claimed is:

1. An information platform system comprising:
a plurality of general-purpose processing modules each being configured to operate, as a corresponding information processing system, any one of a server system, a router system, and a storage system upon installation of a corresponding functional set of programs for the corresponding information processing system on the general-purpose processing module;
a plurality of dedicated processing modules which perform dedicated processing for dedicated devices;
a switching hub which interconnects said plurality of general-purpose processing modules and said plurality of dedicated processing modules;
a storage unit for storing a plurality of functional sets of programs that includes a first functional set of programs used to implement a server system in one of the general-purpose processing modules, a second functional set of programs used to implement a router system in one of the general-purpose processing modules, and a third functional set of programs used to implement a storage system in one of the general-purpose processing modules; and
a management module to which said storage unit is coupled, said management module including:
a module selection unit for selecting, in response to a system configuration request, at least one of said plurality of general-purpose processing modules and at least one of said plurality of dedicated processing modules to configure an information processing system requested by said system configuration request; and
a module setting unit for selecting, from said plurality of functional sets of programs stored in said storage unit, a corresponding functional set of programs required for configuring said requested information processing system, and for installing the selected corresponding functional set of programs into said at least one of said plurality of general-purpose processing modules.

2. An information platform system according to claim 1, wherein each of said functional sets of programs includes an operating system, a driver for I/O devices, and a firmware for an adopter of said general-purpose processing modules.

3. An information platform system according to claim 1, wherein said management module further includes a functional set management table holding information on the corresponding functional sets of programs for each information processing system which can be configured by the information platform system, and wherein said module setting unit selects said corresponding functional set of programs required for configuring said requested information processing system based on said functional set management table.

4. An information platform system according to claim 3, wherein said management module further includes a functional set management unit for registering said information on functional sets of programs into said functional set management table in response to a functional set registration request.

5. An information platform system according to claim 4, wherein said functional set management unit has a verification unit to verify that the functional sets of programs registered in said functional set management table operate properly.

6. An information platform system according to claim 1, wherein said management module further includes a system configuration management table used to manage an information processing system configured in said information platform system and holding information on a general-purpose processing module and a dedicated processing module configuring said managed information processing system.

7. An information platform system according to claim 6, wherein said management module further includes a system identifier management table holding a system type identifier indicating a type of information processing system for each general-purpose processing module composing said information processing system configured in said information platform system.

8. A method for configuring an information processing system in a information platform system, said information platform system comprising a plurality of general-purpose processing modules each of which is configured to operate as a corresponding information processing system any one of a server system, a router system, and a storage system upon installation of a corresponding functional set of programs for the corresponding information processing system on the general-purpose processing module, a plurality of dedicated processing modules each of which performs dedicated processing for dedicated devices, a switching hub which interconnects said plurality of general-purpose processing modules and said plurality of dedicated processing modules, a storage unit which stores a plurality of functional sets of programs that includes a first functional set of programs used to implement a server system in one of the general-purpose processing modules, a second functional set of programs used to implement a router system in one of the general-purpose processing modules, and a third functional set of programs used to implement a storage system in one of the general-purpose processing modules, and a management module to which said storage unit is coupled, said method performed by said management module comprising:

receiving a system configuration request for configuring an information processing system, said system configuration request including information indicating a type of information processing system to be configured;

selecting at least one of said plurality of general-purpose processing modules and at least one of said plurality of dedicated processing modules to configure said information processing system requested by said system configuration request;

selecting, from said plurality of functional sets of programs stored in said storage unit, a corresponding functional set of programs required for configuring said requested information processing system; and installing said selected corresponding functional set of programs into said selected at least one of said plurality of general-purpose processing modules.

9. A method for configuring an information platform system according to claim 8, wherein said system configuration request includes a number of general-purpose processing modules required for said information processing system, and an identifier of a functional set of programs to be used for said information processing system.

10. A method for configuring an information platform system according to claim 9, wherein selecting said processing modules comprises:

selecting candidates of general-purpose processing modules available for configuring said information processing system;

judging whether the number of said candidates selected in said selecting step satisfies the number of general-purpose processing modules designated by said system configuration request; and if the number of said candidates cannot satisfy the number of general-purpose processing modules designated by said system configuration request, determining whether any of general-purpose processing modules already used for another information processing system can be used for said information processing system.

* * * * *